DIALKYLTIN BIS(SUBSTITUTED MERCAPTIDES)

This invention relates to the stabilization of vinyl polymers with organotin compounds, and to new organotin compounds suitable for use for this purpose.

Vinyl chloride polymers and copolymers are thermoplastic in nature and therefore have to be heated in order to soften them during fabrication operations such as calendering and extruding. Such heat is limited in degree and duration by the tendency of the resins to decompose. This decomposition leads to deterioration in the physical properties of the resin. It also results in severe darkening in color of the resin which prohibits its use in lightly colored or transparent articles. This latter property is obviously a major drawback to the use of PVC in many applications. In order to overcome this, several products have been suggested as stabilizers. In general these fall into three main classes, namely: lead salts, barium/cadmium soaps and organotin compounds.

Of these the organotin compounds are the most effective stabilizers, particularly when they contain tin sulphur bonds. Such products are commonly referred to as thiotins.

In our British Specification No. 1,027,781 we demonstrated that advantages were to be gained by using dialkyltin salts derived from esters of triols or polyols with mercaptoacetic or beta-mercapto propionic acid. These salts were shown to be of particular advantage if there was at least one free hydroxyl group remaining in the ester from which the dialkyltin salt was formed. It was concluded that the free hydroxyl group had an important bearing on the course of the stabilization reaction although the manner in which it was effective was not known.

Products derived from esters of triols such as glycerol, trimethylol propane and polyols such as pentaerythritol, all suffer from one major drawback in that they can only be prepared as thick intractable products of a gummy, plastic or elastomeric consistency. These difficulties not only rendered the product unattractive from a sales and handling viewpoint, but also made them difficult to manufacture with the required degree of consistency. Therefore although satisfactory products could be quite easily prepared in the laboratory it proved difficult to reproduce them consistently at full production level. These difficulties are thought to arise because of the potential polymeric nature of the resulting compounds. It is the purpose of this invention to provide a type of compound which is at least as good in performance as those described in British Specification No. 1,027,781, but does not suffer from the same handling and manufacturing difficulties of these compounds.

According to the invention, vinyl resins are stabilized by incorporating therein products obtained by reacting a dialkyltin oxide, hydroxide or dihalide with a monoester of a diol or an alkoxy or acyloxy alcohol with a mercapto-acid.

Examples of suitable diols are ethylene glycol, diethylene glycol, propylene glycol, dipropylene glycol. Suitable alkoxy alcohols include 2-methoxy-ethanol. Suitable acyloxy alcohols include 2-acetoxyethanol. Suitable mercapto-acids include mercapto-acetic acid (also known as thioglycollic acid) and beta-mercaptopropionic acid. The dialkyltin compounds may have alkyl groups of up to 10 carbon atoms, especially butyl or octyl groups.

The facts that the free hydroxyl group of a diol ester can be replaced by an alkoxy group or an acyloxy group, and that compounds derived from diols such as diethylene glycol are very effective appears to indicate that the effective part of the molecule is the oxygen atom and not the free hydroxyl group. It is therefore thought that all types of alkoxy and acyloxy groups would be suitable as well as free hydroxyl groups. This would have the additional advantage that the production of thick intractable compounds would be virtually impossible.

An additional advantage of the new products is that they appear to be universally applicable to the different types of PVC available. There are two principal types of PVC available. The first of these is made by a suspension polymerization process and the second by an emulsion polymerization process. The two types of PVC differ markedly in their handling and stabilization characteristics. The new products described appear to be equally effective in both types of PVC and in this manner differ from products which have been described earlier.

The stabilizers according to the invention may be used in quantities of from 0.5 to 10 percent based on the weight of the vinyl resins.

The products of this invention can be prepared for example by reaction of the dialkyltin oxide with the mono-mercapto ester of the selected glycol or alcohol, or by reaction of a dialkyltin halide with the sodium salt of the ester.

The invention is illustrated by the following examples:

EXAMPLE 1

The selected glycol or alcohol (1 mol) and thioglycollic acid (1 mol) were refluxed together in toluene (150 ml) in an apparatus fitted for azeotropic distillation and the reaction continued until water (1 mol) had been collected. The toluene was then removed under reduced pressure in a rotary evaporator, the ester being obtained in quantitative yield. This ester (1 mol) was then heated to 80° C. and dibutyltin oxide (0.5 mol) added slowly with stirring. When all had dispersed the temperature was increased to 110° C. and held there until all the water of reaction had been removed. The product was then filtered, using a filter aid, to afford the desired salt in approximately 98 percent yield in each instance.

Using this general technique the following compounds were prepared, each of which is thought to be a new compound.

| Compound | R.I. at 17° C. | Viscosity poise at 25° C. |
|---|---|---|
| Dibutyltin-bis-(ethylene glycol thioglycollate) | 1.5518 | 3.4 |
| $$\text{Bu} \diagdown_{\text{Sn}} \diagup^{\text{S}-CH_2CO\cdot O\cdot CH_2CH_2OH}_{\text{S}-CH_2CO\cdot O\cdot CH_2CH_2OH}$$ | | |
| Dibutyltin-bis-(propylene glycol thioglycollate) | 1.5385 | 3.7 |
| $$\text{Bu} \diagdown_{\text{Sn}} \diagup^{\text{S}-CH_2CO\cdot O\cdot CH_2-\overset{CH_3}{\underset{}{CH}}-OH}_{\text{S}-CH_2CO\cdot O\cdot CH_2-\underset{CH_3}{\overset{}{CH}}-OH}$$ | | |
| Dibutyltin-bis-(dipropylene glycol thioglycollate) | 1.5178 | 4.7 |
| Dibutyltin-bis-(2-methoxy ethyl thioglycollate) | 1.5258 | 0.65 |
| $$\text{Bu} \diagdown_{\text{Sn}} \diagup^{\text{S}-CH_2CO\cdot O\cdot CH_2-CH_2OCH_3}_{\text{S}-CH_2CO\cdot O\cdot CH_2-CH_2OCH_3}$$ | | |
| Dibutyltin-bis-(2-acetoxyethyl thioglycollate) | 1.5138 | |

United States Patent
Oakes et al.

[15] 3,665,024
[45] May 23, 1972

[54] DIALKYLTIN BIS(SUBSTITUTED MERCAPTIDES)

[72] Inventors: Vincent Oakes, St. Helens; Brian Rodney Iles, Liverpool, both of England

[73] Assignee: Pure Chemicals Limited, Liverpool, England

[22] Filed: Nov. 18, 1969

[21] Appl. No.: 877,857

[30] Foreign Application Priority Data

Nov. 22, 1968  Great Britain......................55,523/68

[52] U.S. Cl. ..................................260/429.7, 260/45.75 K
[51] Int. Cl. .............................................................C07f 7/22
[58] Field of Search................................................260/429.7

[56] References Cited

UNITED STATES PATENTS 3,525,760   8/1970   Seki et al. ...........................260/429.7
3,525,761   8/1970   Seki et al. ...........................260/429.7

*Primary Examiner*—Tobias E. Levow
*Assistant Examiner*—Werten F. W. Bellamy
*Attorney*—Holman & Stern

[57] ABSTRACT

New organotin compounds, suitable for use as stabilizers for vinyl halide resins, are obtained by reacting a dialkyltin oxide, hydroxide, or dihalide with a monoester of a diol or an alkoxy or acyloxy alcohol with a mercapto-acid.

3 Claims, No Drawings

WHAT IS CLAIMED IS:

1. A compound having the formula $$R_2Sn[S(CH_2)_nCOOR^2OR^3]_2$$

wherein R is an alkyl having up to 10 carbon atoms;
$R^2$ is an alkylene group having up to five carbon atoms, $-(CH_2-CH_2O)_nCH_2CH_2-$ or $-CH_2CH(CH_3)OCH_2CH(CH_3)-$;
$R^3$ is H or $COCH_3$ and
$n = 1$ or 2.

2. A compound as claimed in claim 1, wherein $R^2$ is $-C_2H_4-$ or 
$$-CH_2-CH- \\ \phantom{-CH_2-}CH_3$$

3. A method of preparing a compound as claimed in claim 1 comprising the steps of:
 a. dissolving $R_2SnO$ in acetic anhydride to form the corresponding acetate;
 b. reacting the acetate with a monoester having the general formula $$HS(CH_2)_nCOOR^2OR^3$$

in which R, $R^2$, $R^3$ and $n$ have the same meaning as defined in claim 7; and
 c. removing acetic acid formed during the reaction.

* * * * *